Nov. 4, 1924.

E. C. LOFTNESS 1,513,834

COMBINED VINE STRIPPER AND BEAN OR PEA HULLER

Filed Oct. 23, 1922    2 Sheets-Sheet 1

E. C. Loftness,
INVENTOR.

WITNESSES

BY

ATTORNEYS.

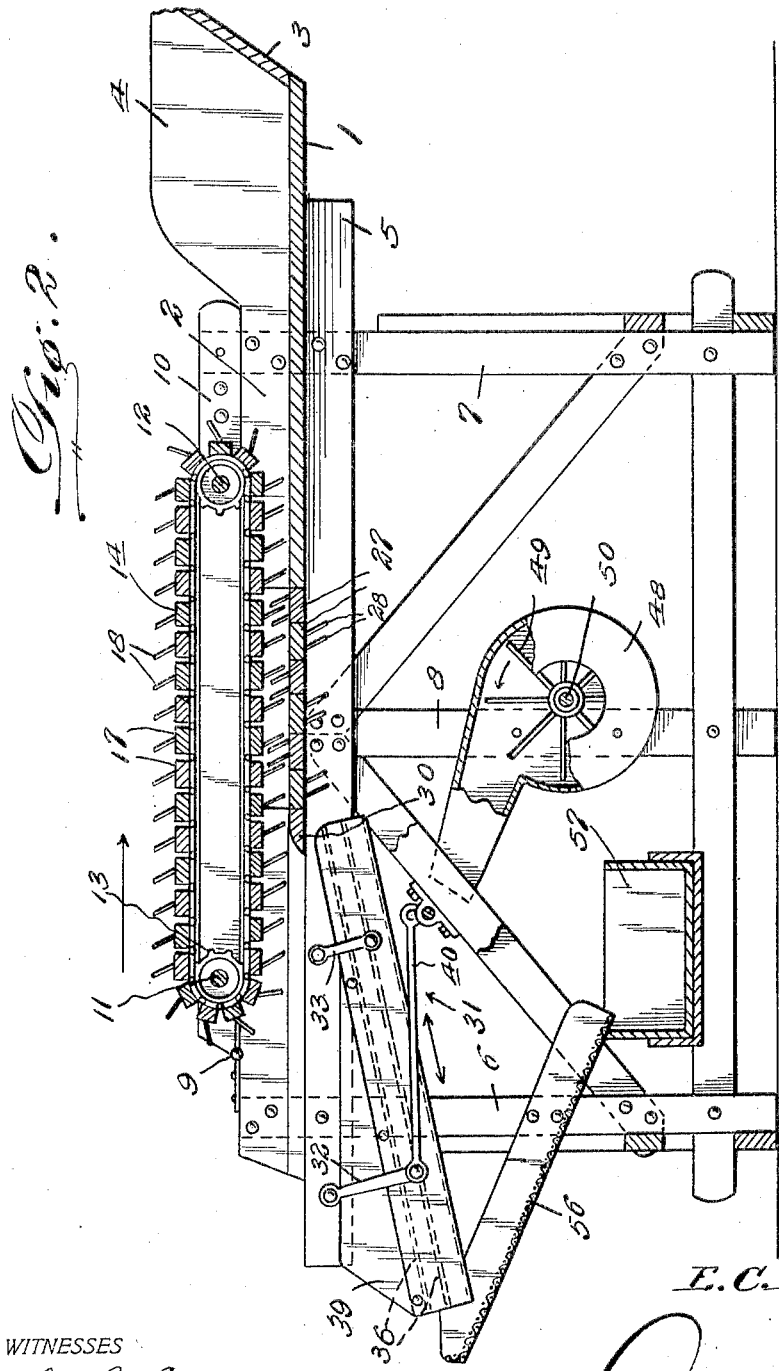

Patented Nov. 4, 1924.

1,513,834

UNITED STATES PATENT OFFICE.

EDWARD C. LOFTNESS, OF GIBBON, MINNESOTA.

COMBINED VINE STRIPPER AND BEAN OR PEA HULLER.

Application filed October 23, 1922. Serial No. 596,502.

*To all whom it may concern:*

Be it known that I, EDWARD C. LOFTNESS, a citizen of the United States, residing at Gibbon, in the county of Sibley and State of Minnesota, have invented certain new and useful Improvements in Combined Vine Strippers and Bean or Pea Hullers, of which the following is a specification.

This invention relates to new and useful improvements in combined vine strippers and bean or pea hullers, and has for the primary object thereof, the provision of such a machine that is comparatively simple of construction, inexpensive of manufacture, simple of operation and highly useful of purpose.

A further object of the invention resides in the provision of a plurality of movable stripper elements adapted to cooperate with a plurality of interchangeable stationary stripper elements for stripping the pods from the vines and for removing the peas or beans therefrom, the said stationary stripper elements being so constructed as to be readily renewable when occasion demands.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is an elevational view of one side of the machine constructed in accordance with the present invention, and Figure 2 is a vertical longitudinal cross sectional view of the device.

Specifically described, the invention contemplates the provision of a machine for stripping beans and peas from their vines, and extracting the same from the pods. The machine includes a plurality of stationary strippers adapted to cooperate with an endless movable apron, having similar strippers associated therewith, the peas and beans on the vines adapted to engage between the movable and stationary strippers whereby the same are stripped from the vines and also removed from the pods. The invention further contemplates the provision of a shaker screen positioned forwardly of the outlet end of the machine, whereby the vines and pods are separated from the beans and peas, a blast fan being provided beneath the screen for blowing away the foreign matter, but allowing the beans and peas to pass therethrough onto another separating screen and thence into a container.

With particular reference to the drawings, the machine includes a relatively elongated floor board 1, having vertically extending side walls 2, the rear ends of which are of increased width and closed by a backing 3 for constituting a hopper 4. Depending side walls 5 are also provided for the floor board 1, and the forward ends of these walls 5 project slightly forwardly of the front end of the said floor board for purposes herein after described. Secured to the side walls 2 and 5 of the floor board are a front and rear pair of supporting legs 6 and 7 respectively, an intermediate pair of supporting legs 8 being further provided between the legs 6 and 7. Hingedly secured as at 9 to a point slightly inwardly of the outer ends, and upon the upper surface of each of the side walls 2 is a longitudinally extending strip 10, and at substantially the forward and rear ends of these opposite strip members, and rotatably supported therebetween is a front and rear rotary shaft member 11 and 12 respectively. Each of these shafts has keyed or otherwise secured thereto, a pair of sprocket wheels 13, inwardly of the spaced ends thereof and between the longitudinally extending side strips 10. The alined sprocket wheels 13 of the shaft 11 and 12, are adapted to receive therebetween endless sprocket chains 14.

As shown in Figures 1 and 2, the rear sprocket wheel carrying shaft 12, engages through longitudinally extending slots 19 in the side supporting strips 10, and the projecting ends of this shaft engage through the eyed ends of eye bolts 20. The annular shanks of these bolts, are threaded as shown, and are adapted to extend through openings within the right angularly bent ends 21 of supporting brackets 22 secured in proper position with respect to the slots 19 of the side supporting strips 10. A nut 23 has screw threaded engagement with the shank of each of the bolts 20 for moving these bolts longitudinally upon the supporting strips 10 when the nuts are rotated, and for consequently applying sufficient attention to the opposite sprocket chains 14. The forward shaft 11, has a pulley wheel 24 secured thereto for receiving a belt thereon, from a suitable source of power (not shown).

In view of the hinged connections 9 for the side supporting strips 10, it will be readily appreciated that these strips together with their associated parts may be swung upwardly and outwardly, for obvious purposes. As a means for retaining these strips 10 in an operative position, the rear ends of the same are provided with small perforations therein for receiving the inner ends of retaining pins 25, slidably positioned within openings in the upper end of the rear supporting legs 7.

Intermediate the ends of the floorboard 1, and the vertically extending side walls 2, the same are cut away for providing a relatively enlarged opening 26 therein. Positioned within this opening and supported at their opposite ends by the upper edges of the depending side walls 5 are a plurality of cross bars 27, preferably six in number, and having extended vertically therethrough spikes or nails 28 constituting the stationary stripper elements. The nails or spikes or the bars 27 are inclined in opposite directions to the similar nails or spikes 18 on the movable stripper bars 17 as clearly shown, and it is to be noted that the nails or spikes upon the movable and stationary stripper bars are arranged in staggered relation with respect to each other.

It will be seen that each alternate stripper bar 27 is so positioned as to have its stripper elements extended downwardly in an inoperative position. Any desired number of the stripper bars 27 may be positioned so as to have their stripper elements cooperate with the stripper elements 18 on the movable stripper bars 17, according to the proportion of these stationary stripper bars being employed if the vines or the pods are in a wet or damp condition. As shown in Figure 1, longitudinally extending strap irons 29 may be employed for retaining the stationary stripper bars in position, these strap irons being detachably secured at their opposite ends to the floor board 1. In view of this construction, it will be readily understood that the stationary stripper bars 27 may be changed as occasion demands, and if any one of these stripper bars becomes broken, the same may be readily renewed.

By referring to Figure 2, it will be seen that the forward end of the base board or floor 1 is cut away for a portion of its length constituting an opening 30 therein. Pivotally supported between the depending side walls 5 and front supporting legs 6 and hanging directly beneath the opening 30 in the base board is a shaker screen, carrying perforated trays 36 denoted in general by the numeral 31. This shaker screen is supported between the walls 5 and legs 6 by a front and rear pair of loosely mounted links 32 and 33 respectively. The forward pair of links 32 are longer than the rear links, consequently supporting the shaker screen in a downwardly inclined position.

Secured to each side wall 35 of the shaker, is a vertically extending apron or shield 39, the upper edges of which lie within the adjacent depending side walls 5 for guiding the material to the shaker 31.

As a means for reciprocating this shaker, the lower connected ends of the front pair of link members 32 are pivotally engaged with rearwardly extending connecting rods 40, and the inner ends of these rods are loosely disposed upon the crank portions 41 of a crank shaft 42. This crank shaft is rotatably supported in bearings 43, carried by the upper edges of side strengthening bars 44, positioned between the front and intermediate pair of supporting legs 6 and 8 respectively. One of the ends of the crank shaft 42 has a pulley 45 keyed thereto for receiving therearound an endless belt 46, this belt also passing over a pulley 47 keyed to the adjacent side of the shaft 11, whereby power is imparted to the crank shaft 42.

Between the intermediate pair of supporting legs 8 there is secured a fan casing 48 having a fan wheel 49 therein, this fan wheel being keyed to a shaft 50 rotatably supported at its opposite ends within bearings 51 secured upon the vertical edges of the intermediate supporting legs 8, a pulley wheel 52 being keyed to one end of the shaft 50 and operatively connected to a pulley 53 upon the adjacent end of the shaft 11 by an endless belt 54. An outlet end 55 of the casing 48 is positioned beneath the upper end of the shaker screen 31 so as to direct a blast of air through this screen for blowing away the vines, pods, and other chaff.

Beneath the lower outlet end of the shaker screen 31 there is supported between the forward pair of supporting legs 6 a stationary screen 56, inclined in an opposite direction to the inclination of the shaker screen 31. The outlet end of this screen 56 is disposed above a receptacle 57, supported upon side reinforcing bars 58 secured to the lower ends of the hereinbefore described supporting legs. In view of the above description, it will be readily understood that the vines, with the pea and bean pods thereon are placed within the hopper 4. These vines are fed beneath the stationary and movable strippers for removing the pods therefrom and at the same time breaking these pods so as to allow the beans or peas to disengage therefrom. After passing through the strippers, the material will be fed forwardly into the shaker screen 31, whereby in view of the shaking action of the screen and the air blast from the fan 49, the vines and pods will be effectively separated from the beans and peas, and blown outwardly off the shaker screen. The beans or peas will roll downwardly upon the upper tray and strike the hoods thereon will pass through the openings 37 therein, and thence upon the next tray and similarly onto and through the bottom wall 34 of the shaker screen onto the stationary screen 56 to be conveyed thereby into the receptacle 57.

While the form of the invention herein shown and described is what is believed to be the preferred embodiment thereof, it is nevertheless to be understood that various forms, modifications and arrangements of the parts may be made without departing from the spirit and scope of the invention as claimed.

What I claim as new is:

A vine stripper comprising a frame, a floor mounted horizontally thereon and including removable cross bars having teeth thereon, a belt mounted for movement above the floor and having a lower run, which is disposed parallel with the floor, transversely disposed bars carried by the belt, teeth carried by said bars, means for moving the belt whereby the teeth which are carried upon the bars thereof may move between the teeth which are supported upon the floor, the teeth upon the floor being upwardly inclined in the direction of the movement of the lower run of the belt, and the teeth which are carried by the bars upon the belt being downwardly inclined in a direction opposite to the direction in which the lower run of the belt moves.

In testimony whereof I affix my signature.

EDWARD C. LOFTNESS.